(12) United States Patent
Ross

(10) Patent No.: US 7,347,092 B1
(45) Date of Patent: Mar. 25, 2008

(54) APPARATUS AND METHOD FOR FLUID FLOW MEASUREMENT

(75) Inventor: David A. Ross, Columbiaville, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/536,167

(22) Filed: Sep. 28, 2006

(51) Int. Cl.
*G01F 1/68* (2006.01)

(52) U.S. Cl. .................................. 73/204.25

(58) Field of Classification Search .............................. 73/204.32–204.26, 861.95, 170.12
See application file for complete search history.

(56) References Cited

U.S. PATENT DOCUMENTS

| | | | |
|---|---|---|---|
| 4,206,638 A * | 6/1980 | Djorup | 73/170.12 |
| 5,263,380 A * | 11/1993 | Sultan et al. | 73/204.26 |
| 6,928,884 B1 | 8/2005 | Pearson | |
| 7,036,367 B2 | 5/2006 | Golan | |

* cited by examiner

*Primary Examiner*—Jewel Thompson
(74) *Attorney, Agent, or Firm*—Scott A. McBain

(57) ABSTRACT

An apparatus and method for fluid flow measurement are provided. The apparatus includes a first thermistor; a second thermistor; a first deflecting member configured to shield the first thermistor from fluid flowing in a first direction; a second deflecting member configured to shield the second thermistor from fluid flowing in a second direction where the second direction is substantially opposite the first direction; and a circuit in electrical communication with the first thermistor and the second thermistor. The circuit includes a comparator for comparing a first signal from the first thermistor to a second signal from the second thermistor. The comparator provides an output indicative of a direction of fluid flowing past the first thermistor and the second thermistor.

20 Claims, 4 Drawing Sheets

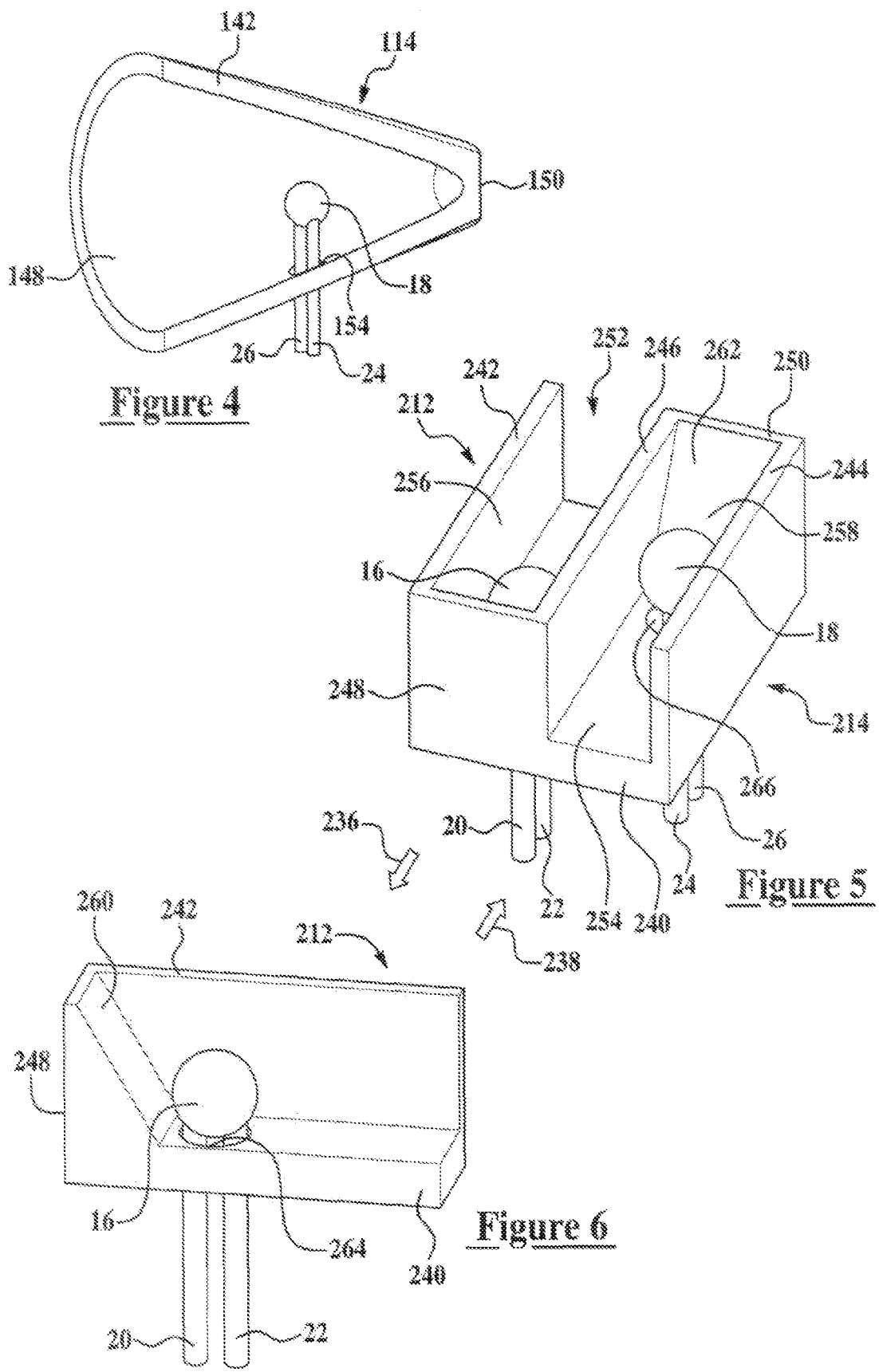

APPARATUS AND METHOD FOR FLUID FLOW MEASUREMENT

TECHNICAL FIELD

The present invention relates generally to a fluid flow measurement device, and more particularly to an apparatus and method for determining the direction of a fluid flow.

BACKGROUND

The anemometers in use today commonly employ a hot wire technology consisting of an electrically heated, fine platinum wire that is immersed into a fluid flow stream. As the velocity of the flow stream increases, the rate of heat transfer from the heated wire to the flow stream increases. Thus, a cooling effect on the wire occurs, causing its electrical resistance to change. In a constant-current anemometer, the fluid velocity is determined from a measurement of the resulting change in wire resistance. In a constant-resistance anemometer, fluid velocity is determined from the current needed to maintain a constant wire temperature and, thus, the resistance.

Hot-wire technology, however, has several drawbacks. The fragility of the sensors can cause loss of calibration or physical damage if a unit is accidentally dropped. Also, the wire may oxidize over time, changing the calibration of the sensors. Further, because the hot-wire signal is weak, a small drift over time can cause loss of calibration or inconsistent readings. When a problem occurs with hot-wire technology, the entire unit must be sent back to the factory for repair and/or recalibration, leaving the user without equipment for several days. In addition, hot-wire anemometers can be very sensitive to a small variance in position relative to the direction of the fluid flow stream.

Other anemometers have been employed using two thermistors placed on opposite sides of a heating element along a single axis. The configuration is placed in the path of a fluid stream so that there is an upstream thermistor and a downstream thermistor and each thermistor monitors the same fluid stream. A thermistor is a temperature-sensing element composed of semiconductor material that exhibits a large change in resistant proportional to a small change in temperature. When no fluid is flowing across the anemometer, a heat wave propagates in all directions from the heating element equally heating both thermistors. When fluid flows across the thermistors, more heat is transferred to the downstream thermistor causing the electrical resistance of the thermistors to respond accordingly. Thus the direction of the flow stream can be calculated by determining which thermistor is warmer. The magnitude of the flow rate can be calculated based on the temperature differential of the thermistors.

Using thermistors in an anemometer provides several advantages over hot-wire technology. The thermistor signal may be as much as 1000 times larger than that of a hot-wire electrode. The sensor will not change calibration significantly and it is resistant to shock and vibration. The thermistor can be dropped without losing its calibration or sustaining physical damage. A disadvantage of the anemometer configuration described above is that it requires the use of an independent heating element, which can consume significant power. It also can be difficult to completely remove noise created by the heat wave itself. Additionally, in order to achieve accurate measurements, two higher-cost thermistors must be provided.

Accordingly, it is desirable to provide an apparatus and method for measuring fluid flow direction that uses two inexpensive sensors and does not require the use of an independent heating element. Such an apparatus and method can be utilized in Continuous Positive Airway Pressure (CPAP) systems, ventilators, automotive systems, and other fluid measurement systems.

SUMMARY OF THE INVENTION

In one exemplary embodiment an apparatus for measuring fluid flow is provided. The apparatus includes a first thermistor; a second thermistor; a first deflecting member configured to shield the first thermistor from fluid flowing in a first direction; a second deflecting member configured to shield the second thermistor from fluid flowing in a second direction where the second direction is different from the first direction; and a circuit in electrical communication with the first thermistor and the second thermistor. The circuit includes a comparator for comparing a first signal from the first thermistor to a second signal from the second thermistor. The comparator provides an output indicative of a direction of fluid flowing past the first thermistor and the second thermistor.

In another exemplary embodiment a method for measuring fluid flow is provided. The method includes sensing fluid flow in a first direction with a first thermistor configured to provide a first signal indicative of fluid flow in the first direction. The method also includes sensing fluid flow in a second direction with a second thermistor configured to provide a second signal indicative of fluid flow in the second direction, the second direction being different from the first direction. The method further includes comparing the first signal to the second signal to determine a direction of the fluid flow, wherein the first thermistor is shielded from fluid flow in the second direction by a first deflecting member and the second thermistor is shielded from fluid flow in the first direction by a second deflecting member.

In another exemplary embodiment an apparatus for measuring fluid flow is provided. The apparatus comprising a first thermistor; a second thermistor, a first deflecting An apparatus for measuring fluid flow, comprising: a first thermistor; a second thermistor; a first deflecting member configured to channel and amplify a fluid flow towards the first thermistor from a fluid flowing in a first direction; a second deflecting member configured to channel and amplify a fluid flow towards the second thermistor from a fluid flowing in a second direction, the second direction being different from the first direction; and a circuit in electrical communication with the first thermistor and the second thermistor, the circuit further comprising a comparator for comparing a first signal from the first thermistor to a second signal from the second thermistor, wherein the comparator will provide an output indicative of a direction of fluid flowing past the first thermistor and the second thermistor.

BRIEF DESCRIPTION OF THE DRAWINGS

The present invention will now be described, by way of example only, with reference to the accompanying drawings in which:

FIG. 4 is a cutaway perspective view of one of the deflecting members of FIG. 3;

FIG. 5 is a perspective view of a pair deflecting members in accordance with another exemplary embodiment of the present invention;

FIG. 6 is a cutaway perspective view of one of the deflecting members of FIG. 5.

DETAILED DESCRIPTION OF EXEMPLARY EMBODIMENTS

Figure 1:
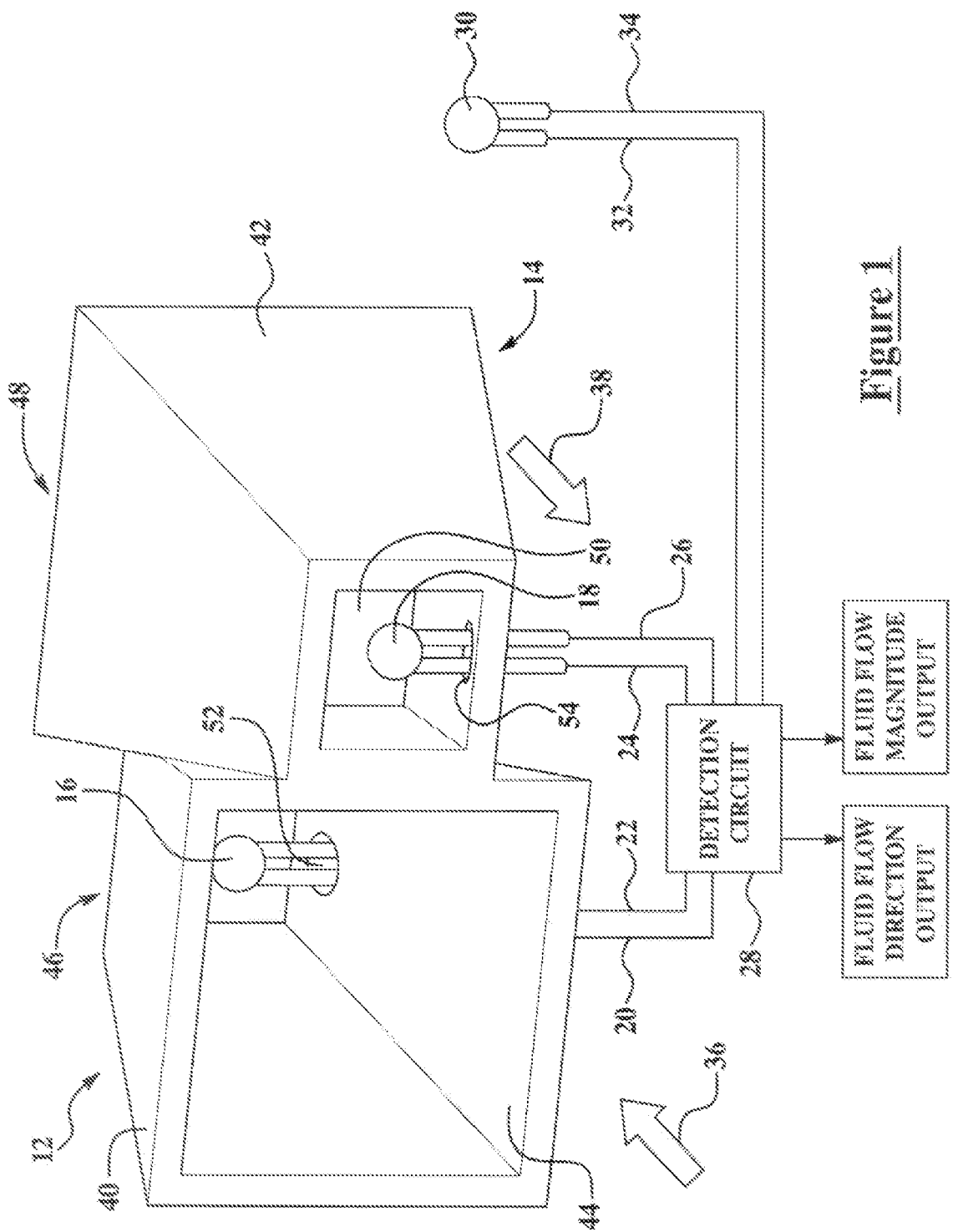
FIG. 1 is a schematic illustration of a fluid flow measurement device constructed in accordance with an exemplary embodiment of the present invention.
Figure 2:
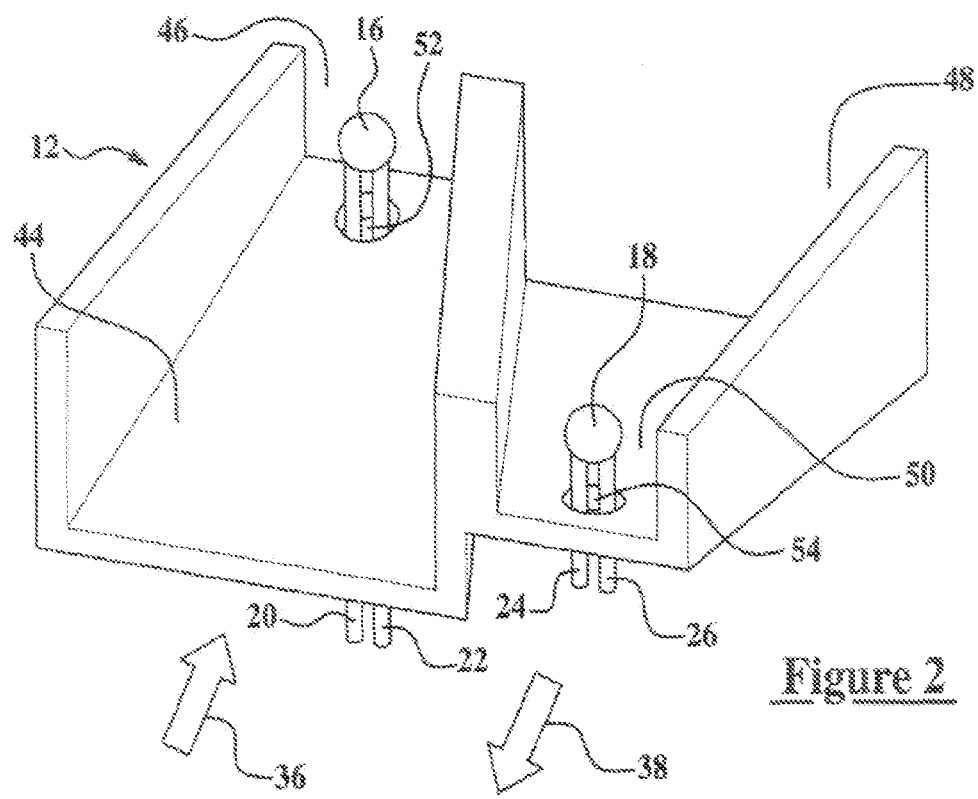
FIG. 2 is a cutaway perspective view of a pair of deflecting members utilized in the fluid flow measurement device of FIG. 1.

Referring now to FIGS. 1 and 2, a schematic illustration of a fluid flow measurement device 10 and a cutaway perspective view of a pair of deflecting members 12, 14 in accordance with an exemplary embodiment of the present invention is illustrated. The fluid flow measurement device 10 includes deflecting members 12, 14, thermistors 16, 18, feedback wires 20, 22, 24, 26, and a detection circuit 28.

The deflecting member 12 is provided to shield thermistor 16 from a portion of a fluid flowing in a direction indicated by arrow 36. Similarly the deflecting member 14 is provided to shield thermistor 18 from a portion of a fluid flowing in a direction indicated by arrow 38. In addition, the deflecting member amplifies magnitude of the flow past each of the thermistors by channeling a given flow into a smaller cross sectional area. For example, the flow is channeled into area 50 when it is moving in the direction of arrow 38 and the flow is channeled into 46 when it is moving in the direction of arrow 36.

In one non-limiting example, the deflecting members 12, 14 each include an elongated conduit 40, 42 having four sidewalls and a hollow center forming a fluid passageway. The elongated conduits 40, 42 have a first opening 44, 48 at one end and a second opening 46, 50 at another end. The first opening 44, 48 and the second opening 46, 50 are positioned along a longitudinal axis at opposite ends of conduits 40, 42 respectively. The sidewalls of conduits 40, 42 are tapered so that the end having the first opening 44, 48 is wider than the end having the second opening 46, 50. Thus, the first opening 44, 48 is larger than the second opening 46, 50. A sidewall of each elongated conduit 40, 42 may also contain a sensor opening 52, 54 positioned near the second opening 46, 50. The sensor openings 52, 54 are provided to receive thermistors 16, 18 respectively, and to allow feedback wires 20, 22, 24, 26 to form an electrical connection between the thermistors 16, 18 and detection circuit 28. In one alternative exemplary embodiment, and when the fluid is a conductive fluid, the thermistors are inserted into the sensor opening via a carrier the electrically insulates them and the circuit form the conductive fluid. Alternatively, a sealant may be applied to the thermistor after it is inserted into the opening.

Although the deflecting members 12, 14 are described herein as identical, it should be understood that the size and shape of each individual deflecting member can vary or be identical as long as functionality is preserved.

The deflecting members 12, 14 are oriented in opposite directions so that the first opening 44 of conduit 40 is adjacent to the second opening 50 of conduit 42. Similarly, the second opening 46 of conduit 40 is adjacent to the first opening 48 of conduit 42. Because of the second opening 50 of conduit 42 has a smaller area than the first opening 44 of conduit 40, deflecting member 14 shields or prevents amplification of the fluid flow past thermistor 18 form a fluid flowing in the direction of arrow 36. In other words, the fluid flowing in the direction of arrow 36 is amplified by deflecting member 12, while deflecting member 14 does not provide fluid flow amplification. Similarly, because the second opening 46 of conduit 40 has a smaller area than the first opening 48 of conduit 42, deflecting member 12 shields thermistor 16 from a portion of the fluid flowing in the direction of arrow 38. The deflecting members 12, 14 can be attached to each other to form a single unit by joining a sidewall of elongated conduit 40 with another sidewall of elongated conduit 42.

Thermistor 16, 18 are provided to generate feedback indicative of the temperature surrounding each of the thermistor 16, 18. Thermistor 16, 18 are preferably Negative Temperature Coefficient (NTC) thermistors, but Positive Temperature Coefficient (PTC) thermistors may be used. In addition other temperature sensitive devices such as RTDs or thermocouples may be used in place of the thermistors 16, 18.

Feedback wires 20, 22, 24, 26 are provided to supply electrical communication between the detection circuit 28 and thermistors 16, 18. Feedback wires 20 and 22 are electrically coupled to parallel between thermistor 16 and the detection circuit 28. Feedback wires 24 and 26 are electrically coupled in parallel between thermistor 18 and the detection circuit 28.

Figure 7:
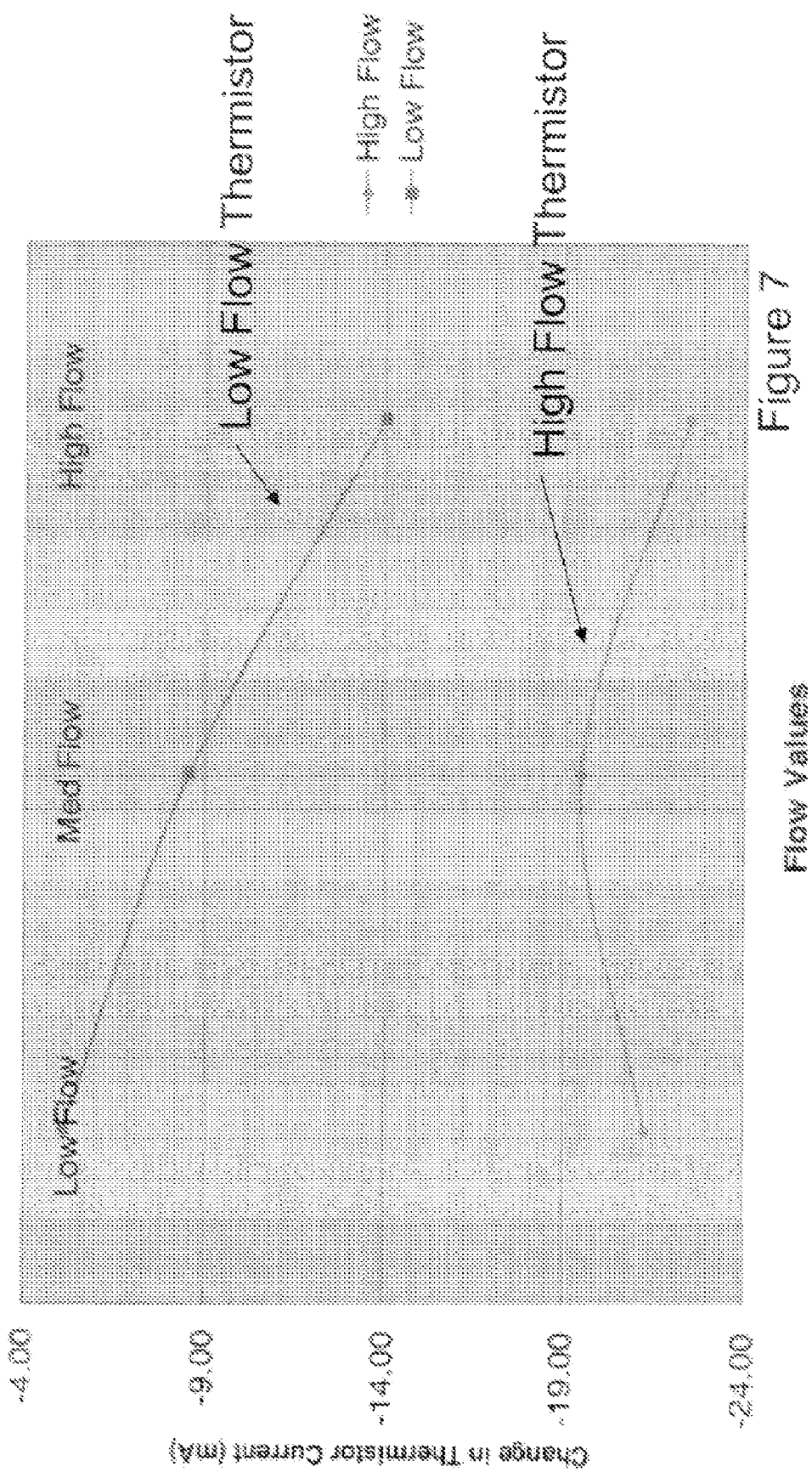
FIG. 7 is a graph illustrating the change in current of two thermistors in accordance with an exemplary embodiment of the present invention.

The detection circuit 28 is provided to receive signals from the thermistors 16, 18 and calculate a direction of fluid flow. The detection circuit 28 receives a signal corresponding to the resistance of thermistor 16 by way of feedback wires 20 and 22 and a signal corresponding to the resistance of thermistor 18 by way of feedback wires 24 and 26. The detection circuit 28 also comprises a comparator circuit that compares the resistance signals from each thermistor 16, 18 and determines which thermistor has a lower temperature. Based on this determination, the comparator device provides an output signal indicating the direction of the fluid flow. FIG. 7 is a graph illustrating the change in current of two thermistors in accordance with an exemplary embodiment of the present invention.

The detection circuit 28 can be designed to calculate the resistance of the thermistors 16, 18 by applying a constant current to each thermistor 16, 18 and measuring the corresponding voltage drop across each thermistor 16, 18. Alternatively, the resistances may also be calculated by applying a constant voltage across a voltage divider circuit comprising a thermistor 16, 18 and a resistor connected in series and measuring the resulting voltage drop across the thermistor 16, 18.

The operation of the fluid flow measurement device 10 will now be described. When a fluid stream is flowing in substantially the direction of arrow 36, the fluid enters the first opening 44 of conduit 40 and the second opening 50 of conduit 42. Because the first opening 44 of conduit 40 is larger than the second opening 46, the fluid that exits conduit 40 flows at a faster rate than the fluid that enters conduit 40. Similarly, because the first opening 48 of conduit 42 is larger than the second opening 50, the fluid that exits conduit 42 flows at a slower rate than the fluid that enters conduit 42. Thus, the fluid stream is flowing at a faster rate across thermistor 16 than it is across thermistor 18. As a result, more heat is convected away from thermistor 16 than from thermistor 18. Thus, thermistor 16 becomes slightly cooler than thermistor 18 causing a differential between their respective resistances. The feedback wires 20, 22, 24, 26 transmit signals to the detection circuit 28 corresponding to the resistances of thermistors 16, 18. Based on these signals, the comparator circuit determines that thermistor 16 is cooler and outputs a signal indicating that the fluid stream is flowing in the direction indicated by arrow 36.

Similarly, when a fluid stream is flowing in substantially the direction of arrow 38, the fluid enters the first opening 48 of conduit 42 and the second opening 46 of conduit 40. In this case, the fluid that exits conduit 42 flows at a faster rate than the fluid that enters conduit 42, and the fluid that exits conduit 40 flows at a slower rate than the fluid that enters conduit 40. Thus, the fluid stream is flowing at a faster rate across thermistor 18 than it is across thermistor 16. As a result, thermistor 18 becomes slightly cooler than thermistor 16 causing a differential between their respective resistances. The comparator circuit determines that thermistor 18 is cooler and outputs a signal indicating that the fluid is flowing in the direction indicated by arrow 38.

An advantage of the present invention is that the direction of a fluid flow stream can be determined by utilizing lower-cost sensors having lower accuracy specifications than sensors used in systems that calculate fluid flow rate. Further, an additional advantage is that an independent heating element is not required for this device to determine the fluid flow direction.

In addition to detecting the flow direction of a fluid flow stream, the fluid flow measurement device 10 can be further configured to measure the fluid flow rate of a fluid stream.

In one non-limiting example, the fluid flow measurement device 10 may also include a third thermistor 30 connected to the detection circuit 28 by way of feedback wires 32 and 34. Thermistor 30 is provided for measuring the magnitude of the fluid flow rate. Thermistor 30 is disposed outside of the deflecting members 12, 14 and therefore is not shielded from fluid flow in any direction. The detection circuit 28 can further include a function for calculating the magnitude of the fluid flow rate based on the resistance of thermistor 30. The function can be implemented by using a look-up table stored on a RAM or ROM chip. The detection circuit 28 calculates the magnitude of the fluid flow rate by comparing the resistance of a third thermistor 30 to a set of values stored in the preprogrammed look-up table. In this example, a thermistor having a high-accuracy level can be utilized for the unshielded thermistor 30 in order to provide an accurate measurement of the fluid flow rate, while cheaper, low-accuracy thermistors can be utilized for the shielded thermistors 16, 18 which are only used to determine the direction of the fluid flow stream.

Alternatively, in another non-limiting example, the fluid flow measurement system 10 utilizing deflecting members 12, 14 (shown in FIGS. 1 and 2) can be further configured to measure the flow rate of a fluid stream without utilizing a third thermistor. To achieve this functionality, the detection circuit 28 can further include a function for calculating the magnitude of the flow rate based upon the resistances of each of the thermistors 16, 18. This function can be implemented by using a look-up table similar to the look-up table described above.

Figure 3:
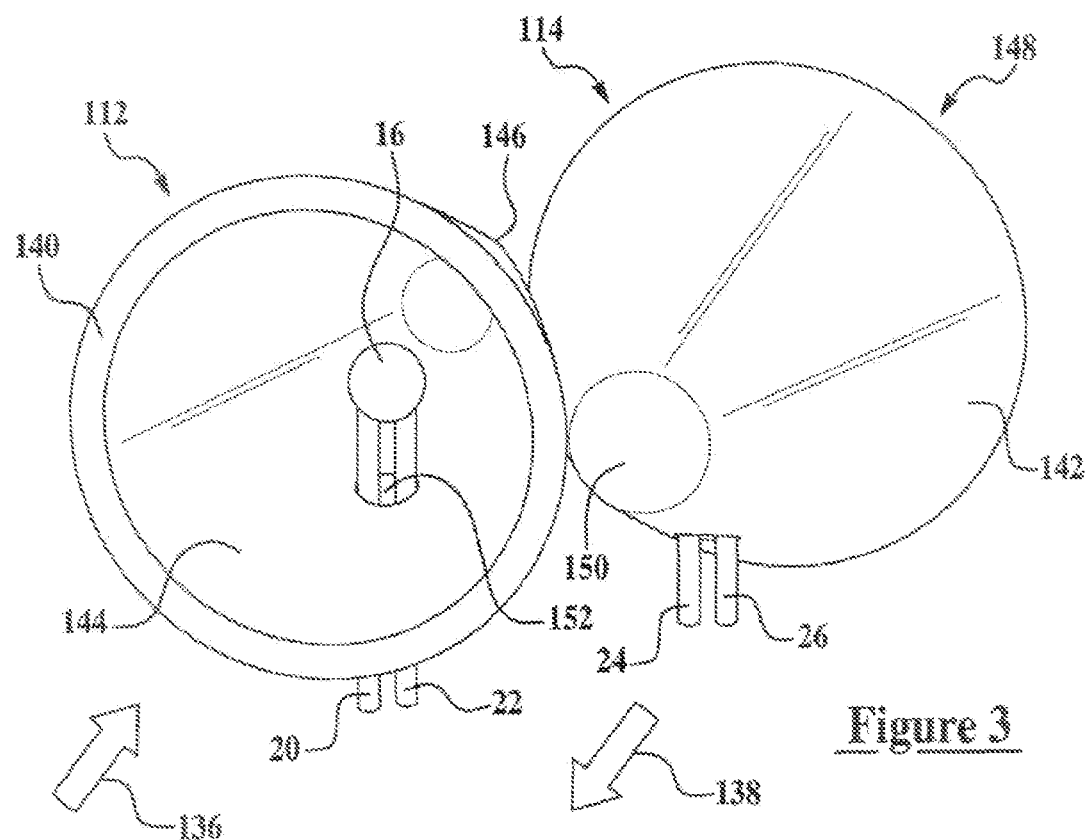
FIG. 3 is a perspective view of a pair of deflecting members in accordance with another exemplary embodiment of the present invention.

Referring now to FIGS. 3 and 4, a perspective view of a pair of deflecting members 112, 114 and a cutaway or cross-sectional perspective view of deflecting member 114 is illustrated in accordance with another exemplary embodiment of the present invention.

Here, deflecting member 112 is provided to shield thermistor 16 from fluid flowing in a direction indicated by arrow 138. Similarly, the deflecting member 114 is provided to shield thermistor 18 from fluid flowing in a direction indicated by arrow 138.

Deflecting members 112, 114 include cone members 140, 142 respectively, each having its apex cut off by a plane parallel to its base. Cone members 140, 142 have an open end 144, 148 near the base and a closed end 146, 150 near the apex forming a cup-like interior, Thus, for each cone member 140, 142, the open end 144, 148 is larger than the closed end 146, 150. The cone members 140, 142 may also have a sensor opening 152, 154 positioned on the side of the cone member 140, 142 centrally between the apex and base of the cone. The sensor openings 152, 154 are provided to receive thermistors 16, 18 respectively and allow the feedback wires 20, 22, 24, 26 to form an electrical connection between the thermistor 16 and the detection circuit 28. Although the deflecting members 112, 114 are described herein as identical, is should be understood that the size and shape of each individual deflecting member can vary or be identical as long as functionality is preserved.

The deflecting members 112, 114 are oriented in opposite directions so that the open end 144 of cone member 140 is adjacent to the closed end 150 of cone member 142. Similarly, the closed end 146 of cone member 140 is adjacent to the open end 148 of cone member 142. The closed end 150 of cone member 142 shields thermistor 18 from fluid flowing in the direction of arrow 136, similarly, closed end 146 of cone member 140 shields thermistor 16 from fluid flowing in the direction of arrow 138. The deflecting members 112, 114 can be attached to each other to form a single unit by joining the side of cone member 140 with the side of cone member 142.

The operation of the fluid flow measurement device 10 utilizing deflecting member members 112, 114 will now be described. When a fluid stream is flowing in substantially the direction of arrow 136, the fluid enters the open end 144 of cone member 140 by way of the open end 144. The closed end 150 of cone member 142 shields thermistor 18 from receiving fluid flowing in the direction of arrow 136. Because more fluid is flowing across thermistor 16 than across thermistor 18, more heat is convected away from thermistor 16 than from thermistor 18. Thus, thermistor 16 becomes slightly cooler than thermistor 18 causing a differential between their respective resistances. The feedback wires 20, 22, 24, 26 transmit signals to the detection circuit 28 corresponding to the resistances of thermistors 16, 18. Based on these signals, the comparator circuit determines that thermistor 16 is cooler and outputs a signal indicating that the fluid is flowing in the direction indicated by arrow 136.

Similarly, when a fluid stream is flowing in substantially the direction of arrow 138, the fluid enters the open end 148 of cone members 142. The closed end 156 of cone member 140 shields thermistor 16 from receiving fluid that is flowing in the direction of arrow 138, because more fluid is flowing across thermistor 18 than thermistor 16, more heat is convected away from thermistor 18 than from thermistor 16. Thus, thermistor 18 becomes slightly cooler than thermistor 16 causing a differential between their respective resistance. The comparator circuit determines that thermistor 18 is cooler and outputs a signal indicating that the fluid is flowing in the direction indicated by arrow 138.

Referring now to FIGS. 5 and 6, a perspective view of a pair of deflecting members 212, 214 and a cutaway or cross-sectional perspective view of deflecting member 212 is illustrated in accordance with another exemplary embodiment of the present invention.

The deflecting member 212 is provided to shield thermistor 16 from fluid flowing in a direction indicated by arrow 238. Similarly, the deflecting member 214 is provided to shield thermistor 18 from fluid flowing in a direction indicated by arrow 236. The deflecting members 212, 214 are formed using a rectangular base 240 having sidewalls 242, 244, center wall 246, and end walls 248, 250. The sidewalls 242, 244 extend from opposite sides of the base. The center wall 246 is disposed between the sidewalls 242, 244 and is configured to be substantially parallel with both sidewalls 242, 244. The end wall 248 is disposed between sidewall 242 and center wall 246 and is configured to shield thermistor 16 from fluid flowing in the direction of arrow 238. Similarly, the end wall 250 is disposed between sidewall 244 and center wall 246 and is configured to shield thermistor 18 from fluid flowing in the direction of arrow 236. The base 240, sidewall 242, and center wall 246 form a U-shaped opening 252 opposite end wall 248 configured to receive fluid flowing in the direction of arrow 236. Similarly, the base 240, sidewall 244, and center wall 246 form a U-shaped opening 254 opposite end wall 250 configured to receive fluid flowing in the direction of arrow 238. The sidewall 242, end wall 248, and center wall 246 form a U-shaped upper opening 256 configured to evacuate fluid flowing through deflecting member 212. Similarly, the sidewall 244, end wall 250, and center wall 246 form a U-shaped upper opening 258 configured to evacuate fluid flowing through deflecting member 214.

Although the deflecting members 212, 214 share a center wall 246, it should be understood that the deflecting member 212, 214 may be formed as separate units by replacing the center wall 246 with two end walls. Further, although the deflecting members 212, 214 are described herein as identical, it should be understood that the size and shape of each individual deflecting member can vary or be identical as long as functionality is preserved.

The deflecting members 212, 214 may also contain inclined surfaces 260 and 262, respectively. The inclined surfaces 260, 262 are provided to streamline the fluid evacuation through upper openings 256, 258 respectively. The inclined surface 260 is formed between sidewall 242 and center wall 246 and is disposed at an angle between the upper opening 256 and the base 240. The inclined surface 262 is formed between sidewall 244 and center wall 246 and is disposed at an angle between the upper opening 258 and the base 240.

The base 240 of the deflecting members 212, 214 may contain sensor openings 264, 266. Sensor opening 264 is positioned between the U-shaped opening 252 and the inclined surface 260. Similarly, sensor opening 266 is positioned between the U-shaped opening 254 and the inclined surface 262. The sensor openings 264, 266 are provided to receive thermistors 16, 18 respectively, and allow the feedback wires 20, 22, 24, 26 to form an electrical connection between the thermistors 16, 18 and the deflection circuit 28.

The operation of the fluid flow measurement device 10 utilizing deflecting member members 212, 214 will now be described. When a fluid stream is flowing in substantially the direction of arrow 236, the fluid enters deflecting member 212 by way of the U-shaped opening 252, deflects off of the inclined surface 260, and exits by way of the upper opening 256. The end wall 250 shields thermistor 18 from receiving fluid flowing in the direction of arrow 236. Because more fluid is flowing across thermistor 16 than across thermistor 18, more heat is convected away from thermistor 16 than from thermistor 18. Thus, thermistor 16 becomes slightly cooler than thermistor 18 causing a differential between their respective resistances. The feedback wires 20, 22, 24, 26 transmit signals to the detection circuit 28 corresponding to the resistance of thermistors 16, 18. Based on these signals, the comparator circuit determines that thermistor 16 is cooler and outputs a signal indicating that the fluid is flowing in the direction indicated by arrow 236.

Similarly, when a fluid stream is flowing in substantially the direction of arrow 238, the fluid enters deflecting member 214 by way of the U-shaped opening 254, deflects off of the inclined surface 262, and exits by way of the upper opening 258. The end wall 248 shields thermistor 16 from receiving fluid flowing in the direction of arrow 238. Because more fluid is flowing across thermistor 18 than thermistor 16, more heat is convected away from thermistor 18 than from thermistor 16. Thus, thermistor 18 becomes slightly cooler than thermistor 16 causing a differential between their respective resistances. The comparator circuit determines that thermistor 18 is cooler and outputs a signal indicating that the fluid is flowing in the direction indicated by arrow 238.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An apparatus for measuring fluid flow, comprising:
   a first thermistor;
   a second thermistor;
   a first deflecting member configured to shield the first thermistor from fluid flowing in a first direction;
   a second deflecting member configured to shield the second thermistor from fluid flowing in a second direction, the second direction being different from the first direction; and
   a circuit in electrical communication with the first thermistor and the second thermistor, the circuit further comprising a comparator for comparing a first signal from the first thermistor to a second signal from the second thermistor, wherein the comparator will provide an output indicative of a direction of fluid flowing past the first thermistor and the second thermistor.

2. The apparatus as in claim 1, wherein the first deflecting member comprises an elongated conduit having a first opening at one end and a second opening at another end, the first opening being larger than the second opening and the second deflecting member comprising an elongated conduit having a first opening at one end and a second opening at another end, the first opening being larger than the second opening and wherein the first opening of the second deflecting member is disposed adjacent to the second opening of the first deflecting member.

3. The apparatus as in claim 1, wherein the first deflecting member comprises a first cone member having an open end and a closed end and the second deflecting member comprises a second cone member having an open end and a closed end, and wherein the closed end of first cone member is disposed adjacent to the open end of the second cone member.

4. The apparatus as in claim 1, wherein the first deflecting member and the second deflecting member are integrally formed with a housing, wherein the housing is configured to have a first opening and a second opening, the first opening being configured to receive fluid flow in the second direction and the second opening being configured to receive fluid flow in the first direction.

5. The apparatus as in claim 4, wherein the first deflecting member further comprises an inclined surface and the first thermistor is located between the first opening and the inclined surface and the second deflecting member further comprises an inclined surface and the second thermistor is located between the second opening and the inclined surface.

6. The apparatus as in claim 5, wherein the first deflecting member and the second deflecting member each have an upper opening disposed adjacent to each other.

7. The apparatus as in claim 1, further comprising a third thermistor, wherein the third thermistor is not shielded by fluid flow in either the first and second direction and the circuit is in electrical communication with the third thermistor and wherein the circuit is configured to determine a flow measurement of the fluid using a plurality of signals received from the third thermistor.

8. The apparatus as in claim 7, wherein the first deflecting member comprises an elongated conduit having a first opening at one end and a second opening at another end, the first opening being larger than the second opening and the second deflecting member comprising an elongated conduit having a first opening at one end and a second opening at another end, the first opening being larger than the second opening and wherein the first opening of the second deflecting member is disposed adjacent to the second opening of the first deflecting member.

9. The apparatus as in claim 7, wherein the first deflecting member comprises a first cone member having an open end and a closed end and the second deflecting member comprises a second cone member having an open end and a closed end, and wherein the closed end of first cone member is disposed adjacent to the open end of the second cone member.

10. The apparatus as in claim 7, wherein the first deflecting member and the second deflecting member are integrally formed with a housing, wherein the housing is configured to have a first opening and a second opening, the first opening being configured to receive fluid flow in the second direction and the second opening being configured to receive fluid flow in the first direction.

11. The apparatus as in claim 10, wherein the first deflecting member further comprises an inclined surface and the first thermistor is located between the first opening and the inclined surface and the second deflecting member further comprises an inclined surface and the second thermistor is located between the second opening and the inclined surface.

12. The apparatus as in claim 11, wherein the first deflecting member and the second deflecting member each have an upper opening disposed adjacent to each other.

13. The apparatus as in claim 1, wherein the fluid is selected from the group comprising: air or other gases, liquids and combinations thereof.

14. The apparatus as in claim 1, wherein the first deflecting member comprises an elongated conduit having a first opening at one end and a second opening at another end, the first opening being larger than the second opening and the second deflecting member comprising an elongated conduit having a first opening at one end and a second opening at another end, the first opening being larger than the second opening and wherein the first opening of the second deflecting member is disposed adjacent to the second opening of the first deflecting member and the wherein the second direction is substantially opposite the first direction.

15. A method for measuring fluid flow, comprising:
sensing fluid flow in a first direction with a first thermistor configured to provide a first signal indicative of fluid flow in the first direction;
sensing fluid flow in a second direction with a second thermistor configured to provide a second signal indicative of fluid flow in the second direction, the second direction being different from the first direction; and
comparing the first signal to the second signal to determine a direction of the fluid flow, wherein the first thermistor is shielded from fluid flow in the second direction by a first deflecting member and the second thermistor is shielded from fluid flow in the first direction by a second deflecting member.

16. The method as in claim 15, wherein the first deflecting member comprises an elongated conduit having a first opening at one end and a second opening at another end, the first opening being larger than the second opening and the second deflecting member comprising an elongated conduit having a first opening at one end and a second opening at another end, the first opening being larger than the second opening and wherein the first opening of the second deflecting member is disposed adjacent to the second opening of the first deflecting member.

17. The method as in claim 15, wherein the first deflecting member comprises a first cone member having an open end and a closed end and the second deflecting member comprises a second cone member having an open end and a closed end, and wherein the closed end of first cone member is disposed adjacent to the open end of the second cone member.

18. The method as in claim 15, wherein the first deflecting member and the second deflecting member are integrally formed with a housing, wherein the housing is configured to have a first opening and a second opening, the first opening being configured to receive fluid flow in the second direction and the second opening being configured to receive fluid flow in the first direction.

19. The method as in claim 15, further comprising:
sensing fluid with a third thermistor, wherein the third thermistor is not shielded by fluid flow in either the first and second direction, wherein the third thermistor is configured to provide a plurality of signals indicative of fluid flow.

20. An apparatus for measuring fluid flow, comprising:
a first thermistor;
a second thermistor;
a first deflecting member configured to channel and amplify a fluid flow towards the first thermistor from a fluid flowing in a first direction;
a second deflecting member configured to channel and amplify a fluid flow towards the second thermistor from a fluid flowing in a second direction, the second direction being different from the first direction; and
a circuit in electrical communications with the first thermistor and the second thermistor, the circuit further comprising a comparator for comparing a first signal from the first thermistor to a second signal from the second thermistor, wherein the comparator will provide an output indicative of a direction of fluid flowing past the first thermistor and the second thermistor.

* * * * *